United States Patent
Kim (10) Patent No.: US 8,325,180 B2
(45) Date of Patent: Dec. 4, 2012

(54) METHOD FOR CHANGING DYNAMIC DISPLAY MODE AND APPARATUS THEREOF IN CAR NAVIGATION SYSTEM

(75) Inventor: Hak-Soo Kim, Suwon-si (KR)

(73) Assignee: Thinkware Systems Corporation, Seoul (KR)

( * ) Notice: Subject to any disclaimer, the term of this patent is extended or adjusted under 35 U.S.C. 154(b) by 742 days.

(21) Appl. No.: 12/513,879

(22) PCT Filed: Sep. 20, 2007

(86) PCT No.: PCT/KR2007/004606
§ 371 (c)(1),
(2), (4) Date: May 7, 2009

(87) PCT Pub. No.: WO2008/056880
PCT Pub. Date: May 15, 2008

(65) Prior Publication Data
US 2010/0045704 A1    Feb. 25, 2010

(30) Foreign Application Priority Data
Nov. 8, 2006  (KR) ........................ 10-2006-0109748

(51) Int. Cl.
G06T 15/00 (2011.01)
G09G 5/00 (2006.01)
G01C 21/00 (2006.01)
G01C 21/34 (2006.01)
G08G 1/123 (2006.01)

(52) U.S. Cl. .................... 345/419; 345/660; 701/436

(58) Field of Classification Search ............. None
See application file for complete search history.

(56) References Cited

U.S. PATENT DOCUMENTS

| 7,376,510 | B1 * | 5/2008 | Green | 701/436 |
| 7,590,487 | B2 * | 9/2009 | De Silva | 701/436 |
| 2008/0040024 | A1 * | 2/2008 | Silva | 701/200 |
| 2008/0062173 | A1 * | 3/2008 | Tashiro | 345/427 |
| 2008/0195314 | A1 * | 8/2008 | Green | 701/211 |

FOREIGN PATENT DOCUMENTS

| JP | 8-234655 | 9/1996 |
| JP | 9-292830 | 11/1997 |
| JP | 10-089990 | 4/1998 |
| JP | 11-337360 | 12/1999 |
| JP | 2000-161969 | 6/2000 |
| JP | 2005-326989 | 11/2005 |
| KR | 10-2000-0062510 | 10/2000 |
| KR | 10-0268071 | 12/2000 |
| KR | 10-0517590 | 9/2005 |
| WO | WO 2006-015892 A1 | 2/2006 |

OTHER PUBLICATIONS

European Search Report issued by the European Patent Office on Dec. 11, 2009 for corresponding European Patent Application No. 07808384.7.
International Search Report for PCT/KR2007/004606 mailed Dec. 27, 2007.
Written Opinion for PCT/KR2007/004606 mailed Dec. 27, 2007.

* cited by examiner

Primary Examiner — Ryan R Yang
(74) Attorney, Agent, or Firm — Nixon & Vanderhye PC

(57) ABSTRACT

A method of changing a display mode in a car navigation system, the method including: acquiring distance information from a current vehicle location to a guide point; and gradually changing the display mode into any one of a two-dimensional display mode and a three-dimensional display mode based on the distance information.

13 Claims, 8 Drawing Sheets

METHOD FOR CHANGING DYNAMIC DISPLAY MODE AND APPARATUS THEREOF IN CAR NAVIGATION SYSTEM

This application is the U.S. national phase of International Application No. PCT/KR2007/004606 filed 20 Sep. 2007 which designated the U.S. and claims priority to Korean Patent Application No. 10-2006-0109748 filed 8 Nov. 2006, the entire contents of each of which are hereby incorporated by reference.

TECHNICAL FIELD

The present invention relates to a method of changing a dynamic display mode in a car navigation system, and an apparatus thereof, and more particularly, to a method of automatically changing any one of a two-dimensional display mode and a three-dimensional display mode based on a guide state when a map is displayed in a car navigation system, and an apparatus thereof.

BACKGROUND ART

Generally, a car navigation system is a system in which a built-in satellite navigation terminal such as a Global Positioning System (GPS) automatically displays a vehicle location, and is referred to as a navigation system. The car navigation system compares location information of a latitude, a longitude, and an altitude received from twenty four GPS satellites from an orbit of about twenty thousands kilometers (km) above the ground, with an output signal of an independent sensor included in a vehicle, detects a current vehicle location, and provides a driver with the detected current vehicle location, a driving direction, and information of various convenient facilities via an Audio/Video (A/V) system included in the vehicle.

The car navigation system stores a map database, provides various driving conditions and a road map, and performs a function establishing traffic control data for each road and the like using various driving conditions and the road map. As described above, since the car navigation system may provide various driving conditions, the road map, and real-time traffic information and maximize a road utilization rate of a user, the car navigation system may play a great role in eliminating traffic jams.

A conventional car navigation system uses two-dimensional map data and a two-dimensional gyro sensor. Accordingly, the conventional car navigation system cannot check whether the vehicle is currently located on a ground road or an overpass by using only a displayed two-dimensional screen since a current vehicle location coordinate using the two-dimensional gyro sensor is calculated in only a horizontal change when a vehicle enters an area where the ground road and the overpass are located in parallel, for example, Submerged bridge and Banpo bridge.

Accordingly, a recent car navigation system may accurately display the current vehicle location using three-dimensional map data and a three-dimensional gyro sensor even in the area where the ground road and the overpass are located in parallel. Also, the recent car navigation system has been developed due to a trend of providing a user with a realistic display mode since the recent car navigation system displays a surrounding building as a solid.

However, a car navigation system to which a conventional three-dimensional display mode is applied has a problem that a sense of distance to a guide point is relatively reduced, compared with a case where the two-dimensional display mode is applied. Also, the car navigation system to which the conventional three-dimensional display mode is applied has a problem that the user cannot easily recognize the guide point since the guide point is hidden behind a building due to displaying a solid building located in a vehicle driving route in the guide point other than a straight section, such as a left-turn section, a right-turn section, and a U-turn section.

DISCLOSURE OF INVENTION

Technical Goals

The present invention provides a method of dynamically changing any one of a two-dimensional display mode and a three-dimensional display mode based on a guide state when a map is displayed in a car navigation system, and an apparatus thereof.

The present invention also provides a method of dynamically changing a display mode in order to increase a view range for a guide point and a recognition rate of the guide point using a current location, a velocity, and remaining distance information of a user received from a Global Positioning System (GPS) using route search data and guide data in a car navigation system, and an apparatus thereof.

The present invention also provides a method of changing a display mode for changing a view angle of a three-dimensional display and a zoom level in accordance with a guide distance or a guide point state, and enabling a user to increase a recognition rate of a guide point so that a user using a car navigation system may accurately recognize the guide point, and an apparatus thereof.

Technical Solutions

According to an aspect of the present invention, there is provided a method of changing a display mode in a car navigation system, the method including: acquiring distance information from a current vehicle location to a guide point; and gradually changing the display mode into any one of a two-dimensional display mode and a three-dimensional display mode based on the distance information.

According to another aspect of the present invention, there is provided an apparatus for changing a display mode in a car navigation system, the apparatus including: a distance information acquisition unit to acquire distance information from a current vehicle location to a guide point; a determination unit to determine whether a vehicle is located within a predetermined distance of the guide point based on the distance information, and determine whether a current display mode of the vehicle is any one of a two-dimensional display mode and a three-dimensional display mode; and a display mode change unit to gradually change the display mode into any one of the two-dimensional display mode and the three-dimensional display mode based on a result of the determination.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
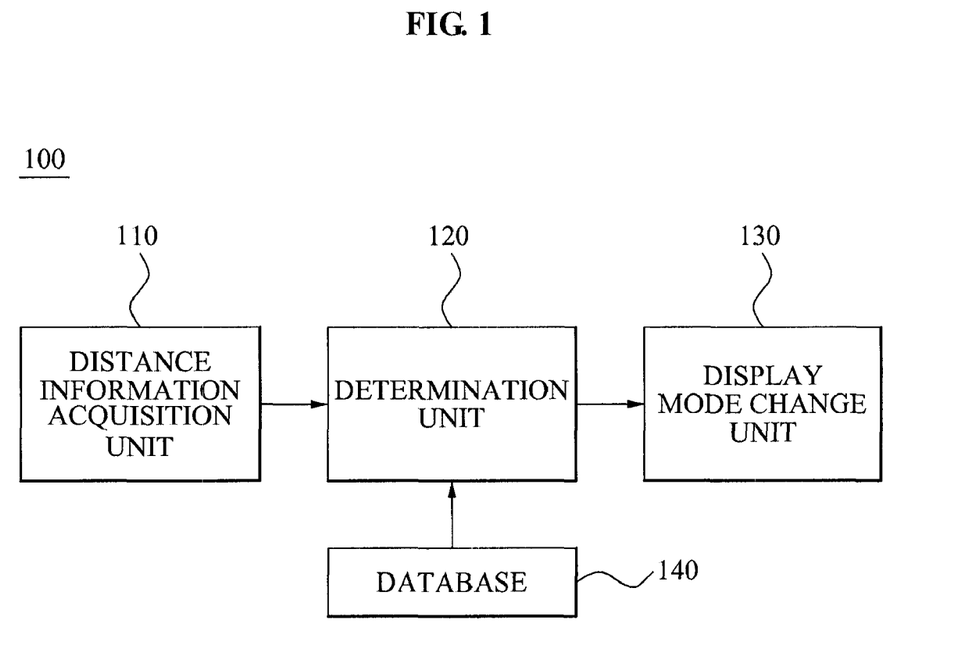
FIG. 1 is a block diagram illustrating an apparatus for changing a dynamic display mode in a car navigation system according to an exemplary embodiment of the present invention.

FIG. 1 is a block diagram illustrating am apparatus 100 for changing a dynamic display mode in a car navigation system according to an exemplary embodiment of the present invention.

Referring to FIG. 1, the apparatus 100 for changing the dynamic display mode according to the present invention includes a distance information acquisition unit 110, a determination unit 120, and a display mode change unit 130.

The distance information acquisition unit 110 acquires distance information from a current location of a vehicle with the car navigation system installed, to a guide point (GP). The GP is a point of guiding a left-turn section, a right-turn section, or a U-turn section being a section excluding a straight feature, for example, an underpass and a tunnel. Accordingly, the distance information acquisition unit 110 may acquire the distance information from the current location where a vehicle 300 illustrated in FIG. 3 is located, to the GP using a Global Positioning System (GPS) (not illustrated) of the car navigation system.

The determination unit 120 determines whether the vehicle is located within a predetermined distance of the GP based on the acquired distance information. Specifically, the determination unit 120 determines whether the vehicle recorded in a database 140 is located within the predetermined distance of the GP based on the acquired distance information.

Figure 3:
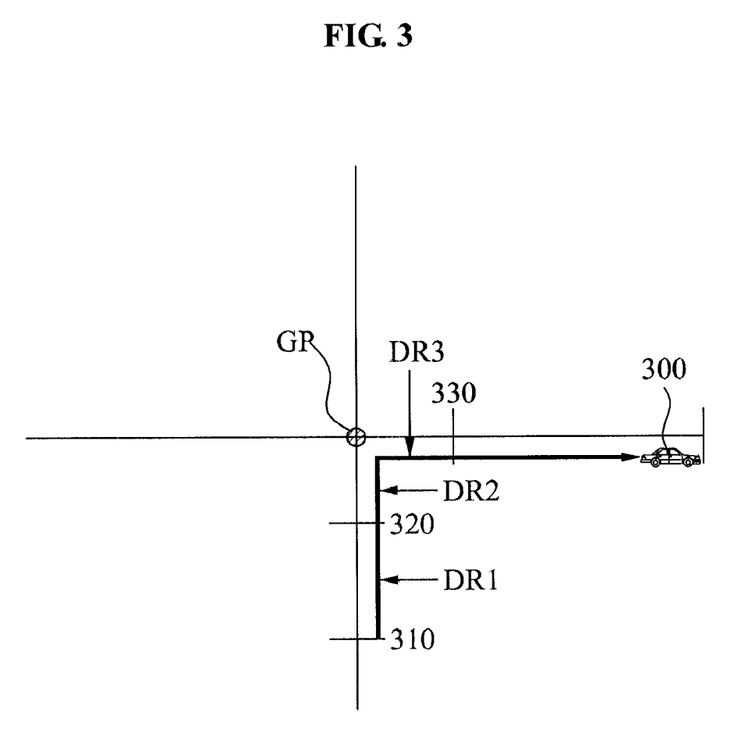
FIG. 3 illustrates a guide point and a vehicle location change in a car navigation system according to an exemplary embodiment of the present invention.

FIG. 3 illustrates a guide point and a vehicle location change in a car navigation system according to an exemplary embodiment of the present invention.

Referring to FIG. 3, a reference number 300 denotes a vehicle location on map data. A reference number 310 denotes a starting point of changing a three-dimensional display mode into a two-dimensional display mode depending on whether a vehicle enters within a predetermined distance of a GP on the map data.

The two-dimensional display mode changes a view angle of the GP in a change section from a point in time of starting a conversion 310, which is convertible from the three-dimensional display mode into the two-dimensional display mode, to a point in time of completing the conversion 320 from the three-dimensional display mode into the two-dimensional display mode. Also, the two-dimensional display mode changes the view angle of the GP according to any one of a map magnification recorded in the database 140 and a display area. For example, since the GP is hidden behind a building and is invisible when the map magnification is low or the displayed area is large, the view angle may be increased.

A reference number 320 denotes a completion point of the three-dimensional display mode as the three-dimensional display mode is changed into the two-dimensional display mode since the vehicle enters the predetermined distance of the GP on the map data.

A reference number 330 denotes a point of changing the two-dimensional display mode into the three-dimensional display mode since the vehicle is located outside the predetermined distance of the GP on the map data.

A first driving route point (DR1) denotes a section of changing the display mode from the three-dimensional display mode to the two-dimensional display mode since the vehicle enters within the predetermined distance of the GP on the map data. A second driving route point (DR2) denotes a two-dimensional display mode section since the vehicle enters within the predetermined distance of the GP on the map data. A third driving route point (DR3) denotes a section of changing the display mode from the two-dimensional display mode to the three-dimensional display mode since the vehicle leaves the predetermined distance of the GP on the map data.

As an example, when the predetermined distance is 300 meters (m), the determination unit 120 may determine that the vehicle is located within the predetermined distance of the GP when a distance from the GP to the reference number 310 is 300 m, and the vehicle is located between the GP and the reference number 310, as illustrated in FIG. 3.

As another example, when the predetermined distance of 300 m is a standard, the determination unit 120 may determine that the vehicle is located outside the predetermined distance of the GP when the vehicle is not located between the GP and the reference number 310 and is located far from the reference number 310, as illustrated in FIG. 3. Also, the determination unit 120 determines that a current display mode of the car navigation system is any one of the two-dimensional display mode and the three-dimensional display mode.

The display mode change unit 130 gradually changes the display mode of the car navigation system into any one of the two-dimensional display mode and the three-dimensional display mode based on a result of the determination. Specifically, the display mode change unit 130 gradually changes the three-dimensional display mode into the two-dimensional display mode when the vehicle is located within the predetermined distance of the GP based on the result of the determination. Also, the display mode change unit 130 gradually changes the two-dimensional display mode into the three-dimensional display mode when the vehicle is located outside the predetermined distance of the GP based on the result of the determination. Hereinafter, a configuration and an operation of the display mode change unit 130 are described in detail with reference to FIG. 2.

Figure 2:
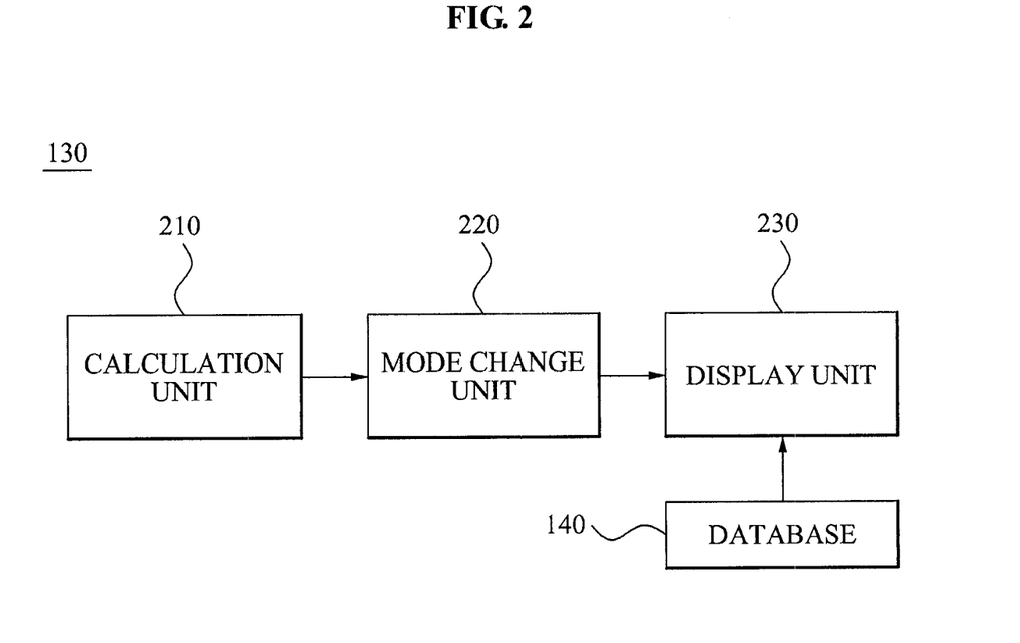
FIG. 2 is a block diagram illustrating a specific example of a display mode change unit of FIG. 1.

FIG. 2 is a block diagram illustrating a specific example of the display mode change unit of FIG. 1.

Referring to FIG. 2, the display mode change unit 130 includes a calculation unit 210, a mode change unit 220, and a display unit 230.

The calculation unit 210 calculates a vertical view angle and a map magnification for changing the display mode into the two-dimensional display mode when the current display mode of the car navigation system is the three-dimensional display mode.

Also, the calculation unit 210 calculates the vertical angle and the map magnification for changing the display mode into the two-dimensional display mode when the current display mode of the vehicle is the three-dimensional display mode. Also, the calculation unit 210 calculates the vertical angle and the map magnification for changing the display mode into the two-dimensional display mode based on a distance and a time when starting a guide when the current display mode of the car navigation system is the three-dimensional display mode. Here, a point in time of starting the guide is a point in time of a starting standard for informing a user of the car navigation system that the vehicle enters within a predetermined distance of the GP, as illustrated in the reference number 310 of FIG. 3.

Also, the calculation unit 210 calculates a vertical view angle and a map magnification for changing the display mode into the three-dimensional display mode based on a distance and a time when completing a guide when the current display mode of the vehicle is the two-dimensional display mode. A point in time of completing the guide is a point in time of a completion standard for informing the user of the car navigation system that the vehicle leaves the predetermined distance of the GP, as illustrated in the reference number 320 of FIG. 3.

The mode change unit 220 gradually changes the current display mode of the car navigation system into any one of the two-dimensional display mode and the three-dimensional display mode based on the calculated vertical view angle and the map magnification.

As an example, the mode change unit 220 gradually changes the three-dimensional display mode into the two-dimensional display mode, or changes the two-dimensional display mode into the three-dimensional display mode by applying the vertical view angle and the map magnification to a display engine.

As another example, when the current display mode of the car navigation system is the three-dimensional display mode, and the vehicle enters the predetermined distance of the GP, the mode change unit 220 gradually changes the three-dimensional display mode into the two-dimensional display mode by applying the vertical view angle and the map magnification to a display engine.

As still another example, the mode change unit 220 changes a view angle of the GP in a change section from a point in time of starting a conversion, which is convertible from the three-dimensional display mode into the two-dimensional display mode, to a point in time of completing the conversion from the three-dimensional display mode into the two-dimensional display mode. Also, the mode change unit 220 may change the view angle of the GP according to any one of a map magnification and a display area based on the distance information.

As described above, the apparatus for changing the display mode in the car navigation system according to the present invention enables the user to accurately recognize the GP by gradually changing the three-dimensional display mode into the two-dimensional display mode when the vehicle enters the predetermined distance of the GP, in order to prevent the GP from being hidden behind a building by the three-dimensional display mode so that the user cannot recognize the GP in advance when the vehicle is located in the GP of a section other than a straight section, such as a left-turn section, a right-turn section, or a U-turn section.

As yet another example, when the current display mode of the car navigation system is the two-dimensional display mode, and the vehicle leaves the predetermined distance of the GP, the mode change unit 220 gradually changes the two-dimensional display mode into the three-dimensional display mode by applying the vertical view angle and the map magnification to a display engine.

As described above, the apparatus for changing the display mode in the car navigation system according to the present invention may provide a realistic solid map service by automatically changing the two-dimensional display mode into the three-dimensional display mode when the vehicle passes through the GP.

The display unit 230 provides a display screen of the car navigation system with the map data recorded in the database 140 based on any one of the two-dimensional display mode and the three-dimensional display mode changed by the mode change unit 220, as illustrated in FIGS. 4 through 7.

Figure 4:
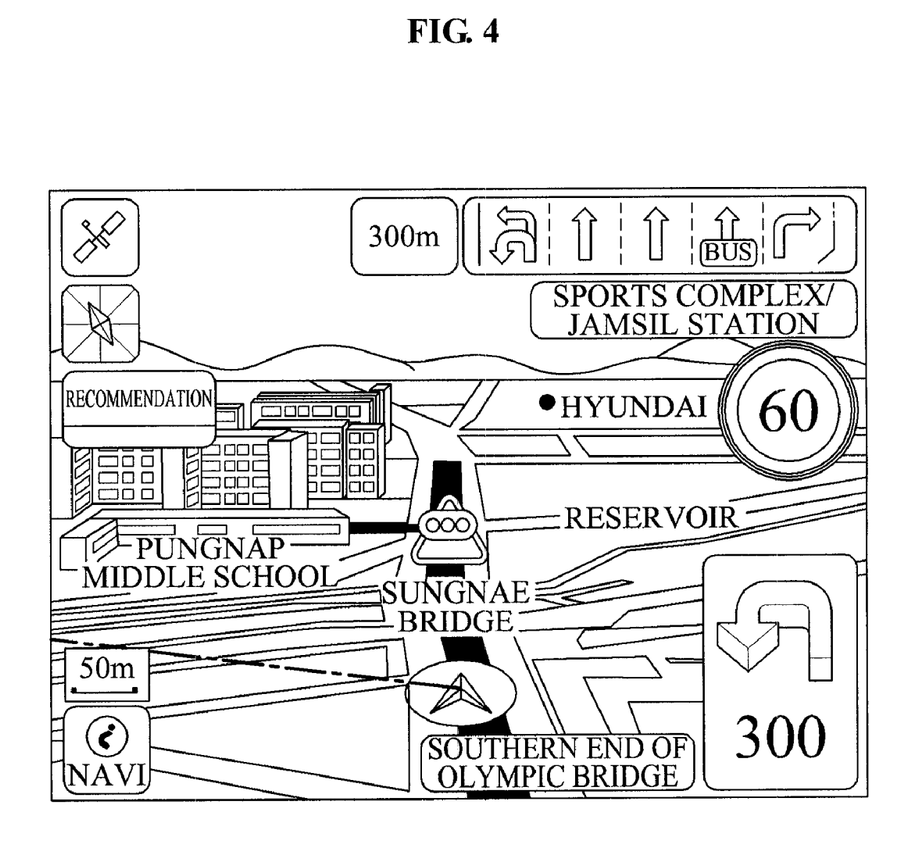
FIG. 4 specifically illustrates an example of three-dimensional display mode screens in a car navigation system according to an exemplary embodiment of the present invention.

FIG. 4 specifically illustrates an example of three-dimensional display mode screens in a car navigation system according to an exemplary embodiment of the present invention.

Referring to FIG. 4, the car navigation system according to the present invention searches for a route desired by a user, and guides the user to a GP for a vehicle driving route to a destination based on the retrieved route by using the three-dimensional display mode screen. Specifically, the car navigation system according to the present invention may provide the three-dimensional display mode screen since the user is not required to immediately recognize the GP when a distance to the GP is greater than or equal to a predetermined distance, for example, 300 m before, even though any one of a left-turn section and a U-turn section exists in a vehicle driving section.

Figure 5:
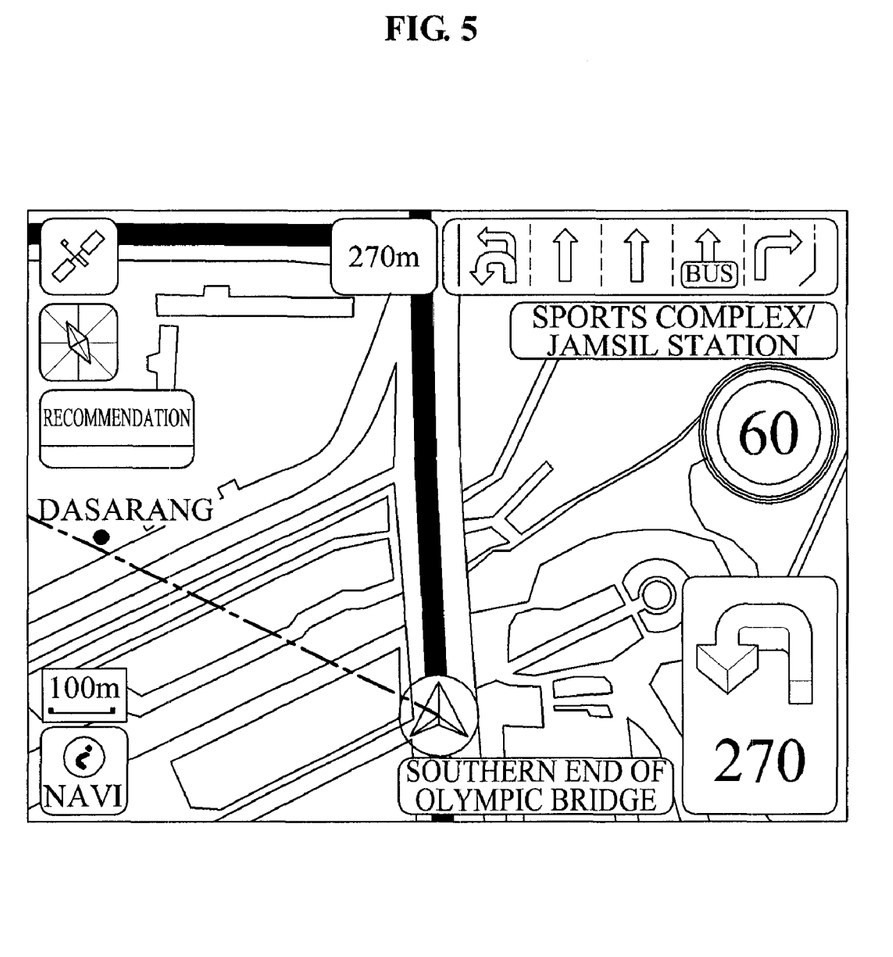
FIG. 5 specifically illustrates an example of two-dimensional display mode screens in a car navigation system according to an exemplary embodiment of the present invention.

FIG. 5 specifically illustrates an example of two-dimensional display mode screens in a car navigation system according to an exemplary embodiment of the present invention.

Referring to FIG. 5, the car navigation system according to the present invention gradually changes a GP for a vehicle driving route from a three-dimensional display mode screen to the two-dimensional display mode screen since a vehicle enters within a predetermined distance of the GP in the retrieved driving route, and guides a user. Specifically, the car navigation system according to the present invention may change the three-dimensional display mode screen into the two-dimensional display mode screen, and provide the two-dimensional display mode since the user may accurately recognize the GP when any one of a left-turn section and a U-turn section exists in a vehicle driving section, and when the vehicle enters the predetermined distance, for example, a distance of 270 m before the GP.

Figure 6:
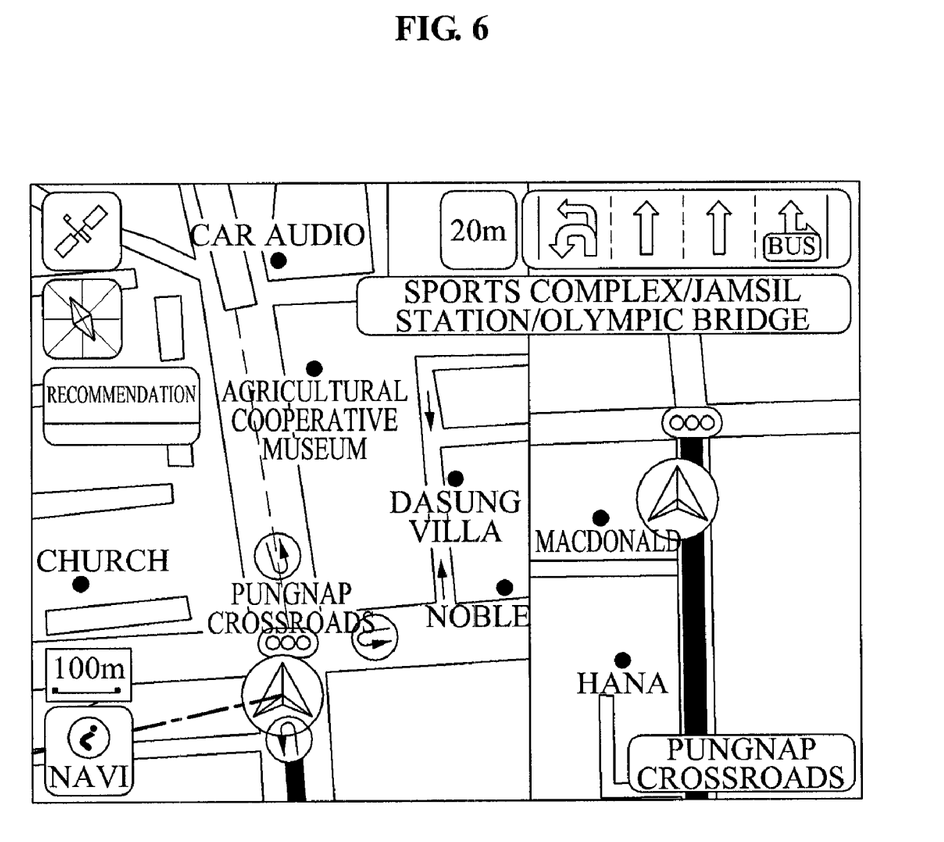
FIG. 6 specifically illustrates another example of two-dimensional display mode screens in a car navigation system according to an exemplary embodiment of the present invention.

FIG. 6 specifically illustrates another example of two-dimensional display mode screens in a car navigation system according to an exemplary embodiment of the present invention.

Referring to FIG. 6, the car navigation system according to the present invention continuously performs a vehicle driving route guide using a two-dimensional display mode screen before a vehicle leaves a predetermined distance of a GP after the vehicle enters within the predetermined distance of the GP in the retrieved driving route. Specifically, the car navigation system according to the present invention continuously performs the route guide using the two-dimensional display mode screen since the user is required to accurately recognize the GP before passing through the GP when any one of a left-turn section and a U-turn section exists in a vehicle driving section, and when the vehicle is located within a short distance, for example, a distance of 20 m before the GP.

Figure 7:
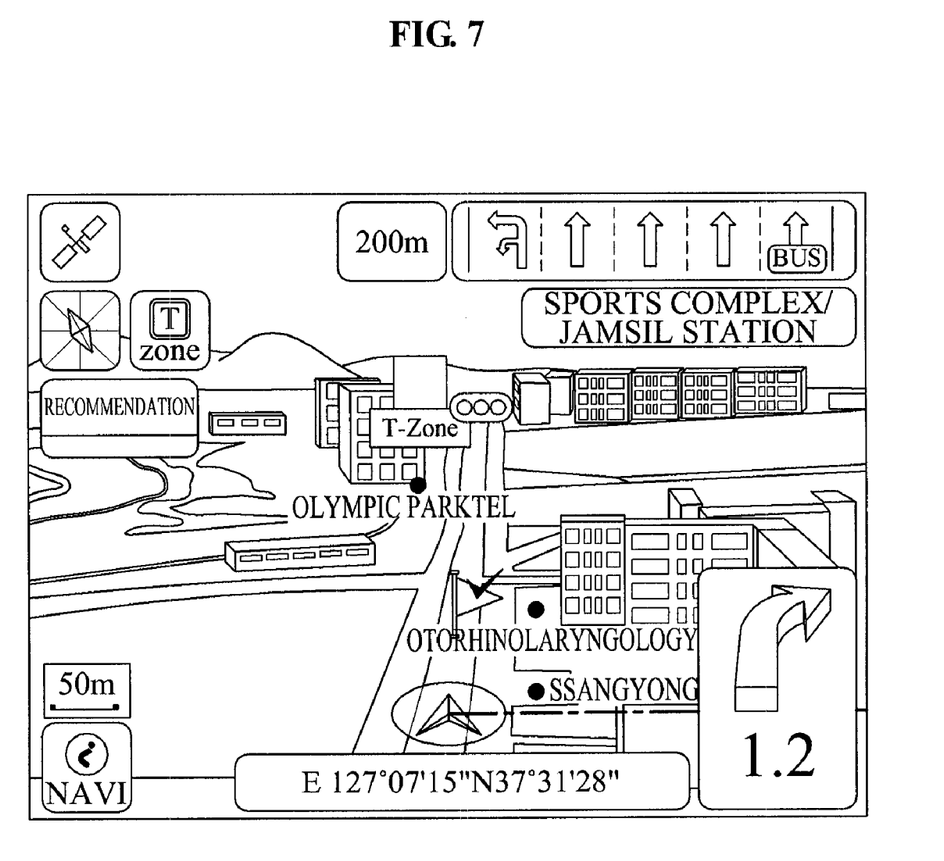
FIG. 7 specifically illustrates another example of three-dimensional display mode screens in a car navigation system according to an exemplary embodiment of the present invention.

FIG. 7 specifically illustrates another example of three-dimensional display mode screens in a car navigation system according to an exemplary embodiment of the present invention.

Referring to FIG. 7, the car navigation system according to the present invention may perform a driving route guide using a three-dimensional display mode screen which may visibly and easily check a surrounding building of the driving route since a user is not required to accurately recognize a GP when a vehicle passes through the GP for the driving route to a destination based on the retrieved route. Specifically, the car navigation system according to the present invention may perform the driving route guide using the three-dimensional display mode screen since the user is not required to immediately recognize the GP, for example, when the vehicle passes through the GP that is located in a straight section where a guide section such as a left-turn section and a U-turn section does not exist in the vehicle driving route.

Figure 8:
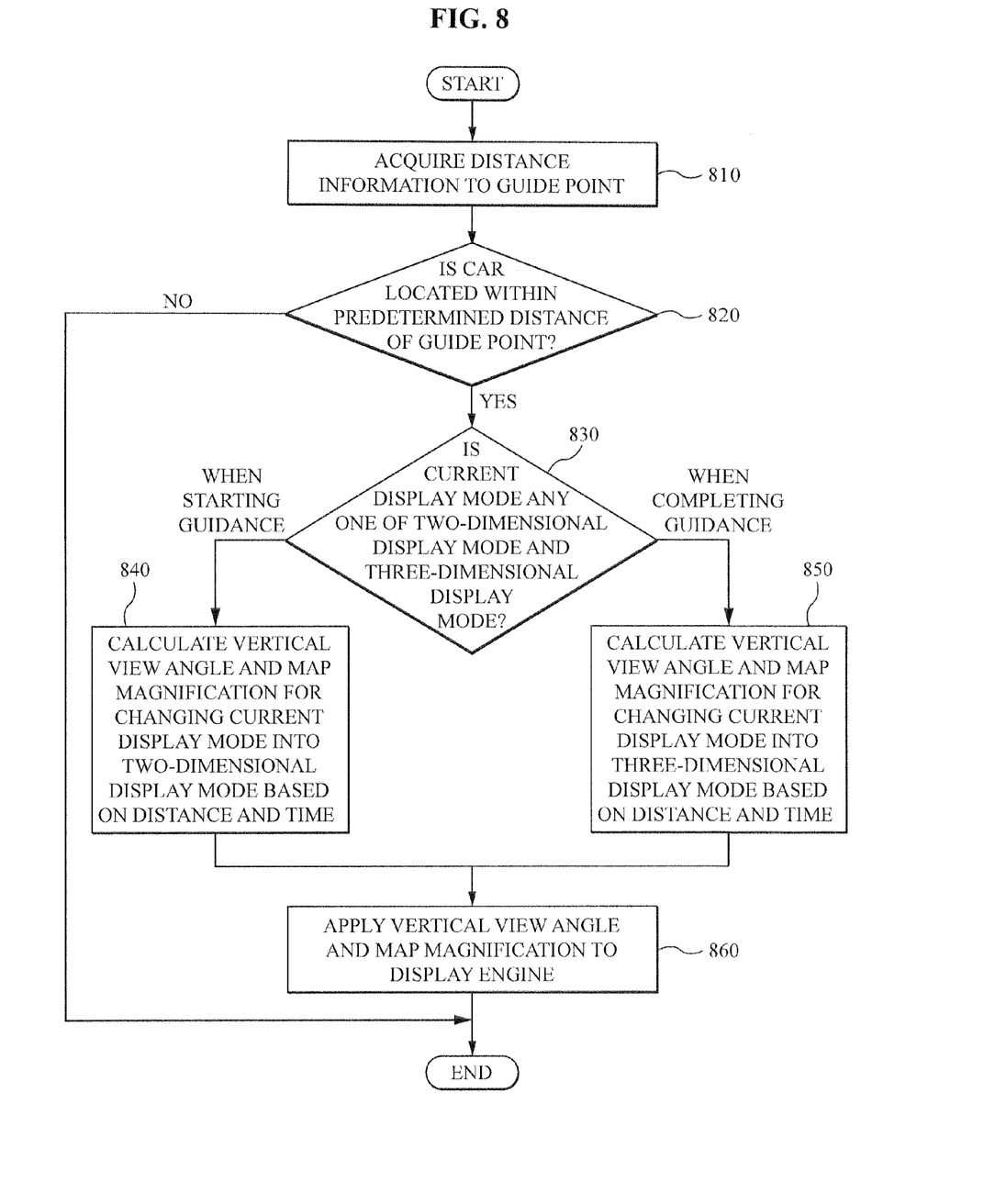
FIG. 8 is a flowchart illustrating a method of changing a dynamic display mode in a car navigation system according to an exemplary embodiment of the present invention.

FIG. 8 is a flowchart illustrating a method of changing a dynamic display mode in a car navigation system according to an exemplary embodiment of the present invention.

Referring to FIG. 8, the car navigation system acquires distance information from a current vehicle location to a GP in operation 810. Specifically, the car navigation system acquires the distance information from a current location of a vehicle with the car navigation system installed, to a GP in operation 810. The GP is a point of guiding a left-turn section, a right-turn section, a U-turn section, and the like being a section other than a straight section, for example, an underpass and a tunnel. Accordingly, the car navigation system may acquire the distance information from the current location where the vehicle 300 illustrated in FIG. 3 is located, to the GP using a GPS.

The car navigation system determines whether the vehicle is located within a predetermined distance of the GP in operation 820. Specifically, the car navigation system may determine whether the current vehicle location is within the predetermined distance of the GP.

When the vehicle is located within the predetermined distance of the GP, the car navigation system determines whether the current display mode is any one of a two-dimensional display mode and a three-dimensional display mode in operation 830.

When starting guidance, the car navigation system calculates a vertical angle and a map magnification for changing the display mode into the two-dimensional display mode based on a distance from the current vehicle location to the GP, and a time required for driving from the current vehicle location to the GP in operation 840. The point in time of starting the guidance includes a case where the vehicle enters the predetermined distance of the GP, and the current display mode is the three-dimensional display mode.

As another example, the car navigation system calculates a vertical angle and a map magnification for changing the display mode into the two-dimensional display mode when the current display mode is the three-dimensional display mode in operation 840.

When completing the guidance, the car navigation system calculates a vertical angle and a map magnification for changing the display mode into the three-dimensional display mode based on a distance from the current vehicle location to the GP, and a time required for driving from the current vehicle location to the GP in operation 850. A point in time of completing the guidance includes a case where the vehicle passes through the GP and is located within the predetermined distance of the GP, or the vehicle in a driving route is located in a straight section excluding the GP such as a left-turn section, a right-turn section, and a U-turn section.

As another example, the car navigation system calculates a vertical angle and a map magnification for changing the display mode into the three-dimensional display mode when the current display mode of the vehicle is the two-dimensional display mode in operation 850.

The car navigation system applies the vertical angle and the map magnification to a display engine, and gradually changes the current display mode into any one of the two-dimensional display mode and the three-dimensional display mode based on the application in operation 860.

As an example, in operation 860, the car navigation system may gradually change the current display mode into the three-dimensional display mode based on the calculated vertical view angle and the map magnification.

As another example, in operation 860, the car navigation system may gradually change the current display mode into the two-dimensional display mode based on the calculated vertical view angle and the map magnification.

As still another example, in operation 860, the car navigation system may gradually change the three-dimensional display mode into the two-dimensional display mode by applying the vertical view angle and the map magnification to a display engine.

As yet another example, in operation 860, the car navigation system may gradually change the two-dimensional display mode into the three-dimensional display mode by applying the vertical angle and the map magnification to a display engine.

As a further example, in operation 860, the car navigation system may gradually change the three-dimensional display mode into the two-dimensional display mode when the vehicle is located within the predetermined distance of the GP based on a result of the determination in operation 820 and operation 830, and the current display mode is the three-dimensional display mode.

As another example, in operation 860, the car navigation system may gradually change the two-dimensional display mode into the three-dimensional display mode when the vehicle is located outside the predetermined distance of the GP based on a result of the determination in operation 820 and operation 830, and the current display mode is the two-dimensional display mode.

As still another example, in operation 860, the car navigation system may change a view angle of the guide point in a change section from a point in time of starting a conversion, which is convertible from the three-dimensional display mode into the two-dimensional display mode, to a point in time of completing the conversion from the three-dimensional display mode into the two-dimensional display mode. Also, in operation 860, the car navigation system may change the view angle of the guide point according to any one of a map magnification and a display area based on the distance information.

The method of changing the dynamic display mode in the car navigation system according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, there may be provided a method of dynamically changing any one of a two-dimensional display mode and a three-dimensional display mode based on a guide state when a map is displayed in a car navigation system, and an apparatus thereof.

Also, according to the present invention, there may be provided a method of dynamically changing a display mode in order to increase a view range for a GP and a recognition rate of the GP using a current location, a velocity, and remaining distance information of a user received from a GPS using route search data and guide data in a car navigation system, and an apparatus thereof.

Also, according to the present invention, there may be provided a method of changing a display mode for changing a view angle of a three-dimensional display and a zoom level in accordance with a guide distance or a guide point state, and enabling a user to increase a recognition rate of a GP so that a user using a car navigation system may accurately recognize the GP, and an apparatus thereof.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of changing a display mode in a car navigation system, the method comprising:
acquiring distance information from a current vehicle location to a guide point; and
gradually changing the display mode into any one of a two-dimensional display mode and a three-dimensional display mode based on the distance information, wherein the changing comprises
calculating a vertical view angle and a map magnification for changing the current display mode into the two-dimensional display mode when the current display mode is the three-dimensional display mode; and
gradually changing the current display mode into the two-dimensional display mode based on the vertical view angle and the map magnification.

2. The method of claim 1, wherein the changing comprises:
calculating the vertical view angle and the map magnification for changing the current display mode into the three-dimensional display mode when the current display mode is the two-dimensional display mode; and
gradually changing the current display mode into the three-dimensional display mode based on the calculated vertical view angle and the map magnification.

3. The method of claim 1, wherein the changing comprises:
calculating the vertical view angle and the map magnification for changing the display mode into the two-dimensional display mode based on a distance and a time when starting a guide when the current display mode is the three-dimensional display mode; and
gradually changing the three-dimensional display mode into the two-dimensional display mode by applying the vertical view angle and the map magnification to a display engine.

4. The method of claim 1, wherein the changing comprises:
determining whether a vehicle is located within a predetermined distance of the guide point based on the distance information; and
gradually changing the display mode into any one of the two-dimensional display mode and the three-dimensional display mode based on a result of the determination.

5. The method of claim 4, wherein the changing of the display mode into any one of the two-dimensional display mode and the three-dimensional display mode based on a result of the determination comprises:
gradually changing the three-dimensional display mode into the two-dimensional display mode when the vehicle is located within the predetermined distance of the guide point; and
gradually changing the two-dimensional display mode into the three-dimensional display mode when the vehicle is located outside the predetermined distance of the guide point.

6. A non-transitory computer-readable recording medium storing a program for implenting the method according to claim 4.

7. An apparatus for changing a display mode in a car navigation system, the apparatus comprising:
a distance information acquisition unit to acquire distance information from a current vehicle location to a guide point;
a determination unit to determine whether a vehicle is located within a predetermined distance of the guide point based on the distance information, and determine whether a current display mode of the vehicle is any one of a two-dimensional display mode and a three-dimensional display mode; and
a display mode change unit to gradually change the display mode into any one of the two-dimensional display mode and the three-dimensional display mode based on a result of the determinations,
wherein the display mode change unit comprises
a calculation unit to calculate a vertical view angle and a map magnification for changing current display mode into the two-dimensional display mode when the current display mode is the three-dimensional display mode; and
a mode change unit to gradually change the current display mode into the two-dimensional display mode based on the vertical view angle and the map magnification.

8. The apparatus of claim 7, wherein the display mode change unit comprises:
a calculation unit to gradually change the three-dimensional display mode into the two- dimensional display mode when the vehicle is located within the predetermined distance of the guide point; and a mode change unit to gradually change the two-dimensional display mode into the three-dimensional display mode when the vehicle is located outside the predetermined distance of the guide point.

9. The apparatus of claim 7, wherein the display mode change unit comprises: a calculation unit to calculate the vertical view angle and the map magnification for changing the current display mode into the three-dimensional display mode when the current display mode is the two-dimensional display mode; and a mode change unit to gradually change the two-dimensional display mode into the three-dimensional display mode based on the calculated vertical view angle and the map magnification.

10. The apparatus of claim 7, wherein the display mode change unit comprises:

a calculation unit to calculate the vertical view angle and the map magnification for changing the display mode into the two-dimensional display mode based on a distance and a time when starting a guide when the current display mode is the three-dimensional display mode; and a mode change unit to gradually change the three-dimensional display mode into the two-dimensional display mode by applying the vertical view angle and the map magnification to a display engine.

11. The apparatus of claim 7, wherein the display mode change unit comprises:

a calculation unit to calculate the vertical view angle and the map magnification for changing the display mode into the three-dimensional display mode based on a distance and a time when completing a guide when the current display mode is the two-dimensional display mode; and a mode change unit to gradually change the current display mode into the three-dimensional display mode by applying the vertical view angle and the map magnification to a display engine.

12. The apparatus of claim 7, wherein the two-dimensional display mode changes the vertical view angle of the guide point in a change section from a point in time of starting a conversion, which is convertible from the three-dimensional display mode into the two-dimensional display mode, to a point in time of completing the conversion from the three-dimensional display mode into the two-dimensional display mode.

13. The apparatus of claim 12, wherein the two-dimensional display mode changes the vertical view angle of the guide point according to any one of a map magnification and a display area based on the distance information.

* * * * *